United States Patent
Meyers

(10) Patent No.: US 12,228,224 B1
(45) Date of Patent: Feb. 18, 2025

(54) SEAL COMPONENT FOR FLUID DISTRIBUTION SYSTEM

(71) Applicant: TWM IP, LLC, Lake Zurich, IL (US)

(72) Inventor: Theodore W. Meyers, Barrington, IL (US)

(73) Assignee: TWM IP, LLC, Lake Zurich, IL (US)

( * ) Notice: Subject to any disclaimer, the term of this patent is extended or adjusted under 35 U.S.C. 154(b) by 0 days.

(21) Appl. No.: 18/941,041

(22) Filed: Nov. 8, 2024

Related U.S. Application Data

(60) Provisional application No. 63/693,015, filed on Sep. 10, 2024.

(51) Int. Cl.
| | | |
|---|---|---|
| *F16L 17/02* | (2006.01) | |
| *F16L 17/025* | (2006.01) | |
| *F16L 21/02* | (2006.01) | |

(52) U.S. Cl.
CPC .......... *F16L 17/025* (2013.01); *F16L 21/022* (2013.01)

(58) Field of Classification Search
CPC .............................. F16L 17/025; F16L 21/022
See application file for complete search history.

(56) References Cited

U.S. PATENT DOCUMENTS

| | | | |
|---|---|---|---|
| 4,663,036 A | 5/1987 | Strobl, Jr. et al. | |
| 4,732,397 A | 3/1988 | Gavin | |
| 4,805,920 A | 2/1989 | Gavin | |
| 4,809,994 A | 3/1989 | Skinner et al. | |
| 4,951,914 A | 8/1990 | Meyers et al. | |
| 5,222,334 A * | 6/1993 | Hasty ................ | E04D 13/1476 |
| | | | 52/219 |
| 5,286,040 A * | 2/1994 | Gavin ..................... | F16L 5/10 |
| | | | 277/609 |
| 5,601,291 A | 2/1997 | Gavin | |
| 5,624,123 A | 4/1997 | Meyers | |
| 5,626,346 A | 5/1997 | Gavin | |
| 5,655,564 A | 8/1997 | Gavin | |
| 5,711,536 A | 1/1998 | Meyers | |
| D405,166 S | 2/1999 | Gavin | |
| 5,882,014 A * | 3/1999 | Gavin ..................... | F16L 5/10 |
| | | | 277/602 |
| 6,450,505 B1 | 9/2002 | Gavin | |
| 6,691,975 B1 | 2/2004 | Gavin | |
| 6,817,631 B1 * | 11/2004 | Gavin ................... | F16J 15/025 |
| | | | 277/606 |
| 7,814,709 B1 * | 10/2010 | Resech ............... | E04D 13/1407 |
| | | | 52/302.1 |
| 8,079,599 B2 | 12/2011 | Meyers | |

(Continued)

*Primary Examiner* — Vishal A Patel
(74) *Attorney, Agent, or Firm* — MARSHALL, GERSTEIN & BORUN LLP

(57) ABSTRACT

A seal component includes a cylindrical wall, a frustoconical wall extending inwardly from the cylindrical wall, and a seal plate enclosing the frustoconical wall. The seal plate includes a first removable panel and a second removable panel, the second removable panel disposed within an area of the first removable panel. A seal component includes a circumferential ridge circumscribing the second removable panel, the circumferential ridge integrally formed with the seal plate and removably coupled with at least the second removable panel. Additionally, the seal plate includes circumferential grooves and scoring lines that provide a cutting guide to facilitate cutting and removing at least one of the first and second removable panels.

17 Claims, 15 Drawing Sheets

(56) References Cited

U.S. PATENT DOCUMENTS 8,608,206 B2 * 12/2013 Fedale, Sr. .......... E04D 13/1407
                                                               285/43
2001/0052675 A1     12/2001 Gavin

* cited by examiner

SEAL COMPONENT FOR FLUID DISTRIBUTION SYSTEM

CROSS-REFERENCE TO RELATED APPLICATION

This non-provisional application claims the benefit of the filing date of U.S. Provisional Application No. 63/693,015, filed Sep. 10, 2024, the entirety of which is hereby incorporated by reference.

FIELD

The present disclosure relates to seal components for fluid distribution systems.

BACKGROUND

On-site waste disposal systems utilize various plastic and poured concrete septic tanks, drop boxes, and distribution boxes. The on-site waste disposal systems are mostly or entirely disposed underground. Pipes fluidly couple the components of the waste disposal system and the drain field. The pipes are sealed to the components of the on-site waste disposal system to reduce or prevent leaks from the waste disposal system into the surrounding ground.

DESCRIPTION OF THE RELATED ART

There have been several attempts to provide plastic seals which can be cast into the walls of a poured concrete septic system component during its formation. However, certain problems have arisen with several of these attempts. U.S. Pat. Nos. 4,732,397, 4,805,920 and 5,286,040 disclose one type of pipe seal for use in concrete box walls. It is formed as a one-piece unit with an integrally-formed seal plate covering off the opening of its frustoconical wall. However, that type pipe seal design has numerous disadvantages. One is that the user has to be very careful in removing the panel from the operating end of the frustoconical wall. For example, if the frustoconical wall's operating end is at all torn or if the seal plate is not properly removed (e.g., leaves a jagged edge), pipe sealing problems can arise. That is, either the frustoconical wall will tear further and become inoperable when a pipe is inserted through it, or the seal plate will not provide a good watertight seal to the inserted inlet line or drainpipe. Further, since the casting forms used to pour the concrete box walls are often installed at a slant to vertical, this type pipe seal requires the use of specific angled spacer members or a mandrel to assure that the seal is forced completely flat against the mating form wall.

However, in the typical concrete casting operation, such precise alignment is rarely achieved, such that poured concrete is often able to undesirably seep behind the frustoconical wall. The presence of such concrete creates significant sealing problems should a pipe ever be inserted through the seal plate and/or frustoconical wall. Further yet, the commercially available embodiment made in accordance with U.S. Pat. Nos. 4,732,397, 4,805,920, and 5,286,040 includes three tearaway lines, i.e., one each for 2, 3, and 4 inch pipe. However, in actual use, those "extra" tearaway lines act as inherent built-in failure points. That is, if one of such tearaway lines does not fail from associated backfill pressure exerted against the membrane, then often another one will.

U.S. Pat. No. 4,951,914 (owned by the assignee of the subject invention) discloses a two-piece pipe seal assembly which has a primary seal body with an integrally joined frustoconical wall, and a separate seal plate which fits within an interior groove formed in the seal body's inner wall. However, that seal assembly has the disadvantage that two pieces are required to be produced, shipped, assembled, and used. Further, unless some thickness of concrete "flash" is present (behind the membrane) to maintain the separate knock-out member in position vis-a-vis the seal body, backfill forces can push against that knock-out member sometimes causing it to be displaced. (Reference is made to U.S. Pat. No. 4,951,914 for a description of the general use, installation and operation of such polymer pipe seal assemblies.)

There also exist very similar plastic seal products which are fitted into the walls of plastic distribution box components for fluid drainage systems. One such plastic box and plastic seal component combination is disclosed in co-owned U.S. Pat. No. 4,663,036. The seal includes a frustoconical wall or seal plate for engaging the exterior of a pipe and the seal plate may extend across the free end of the frustoconical wall for sealing a particular opening. Removal of the seal plate from the free end of the frustoconical wall can damage the free end of the frustoconical wall similar to the constructions described above.

SUMMARY OF THE DISCLOSURE

Disclosed herein is a seal component, including a cylindrical wall and a frustoconical wall extending inwardly from the cylindrical wall. The seal component also includes a seal plate enclosing the frustoconical wall, the seal plate including a first removable panel and a second removable panel. The second removable panel is disposed within an area of the first removable panel. Additionally, the seal component also includes a circumferential ridge circumscribing the second removable panel, the circumferential ridge integrally formed with the seal plate and removably coupled with at least the second removable panel.

In some variations, the circumferential ridges include a first circumferential ridge disposed on a first side of the seal plate, the seal component further including a second circumferential ridge disposed on a second side of the seal plate, the second circumferential ridge radially misaligned relative to the first circumferential ridge.

In other variations, each of the first and second removable panels is circular. Additionally, the first and second removable panels may not be coaxial. Furthermore, the second removable panel can include a circumferential groove adjacent the circumferential ridge, wherein the circumferential groove is inwardly disposed relative to the circumferential ridge.

In yet other variations, the first and second removable panels each can include a respective cutting guide. Additionally, the seal component can include a circumferential groove inwardly disposed adjacent to the circumferential ridge, wherein the cutting guide includes a linear rib and a curved rib disposed between the linear rib and the circumferential groove.

In other variations, the frustoconical wall is flexible.

In some aspects, described herein is a method of using a seal component, including: providing the seal component having a cylindrical wall, a frustoconical wall extending inwardly from the cylindrical wall, a seal plate enclosing the frustoconical wall and including a removable panel, a circumferential ridge circumscribing the removable panel, a circumferential groove disposed inwardly adjacent relative to the circumferential ridge, and a cutting guide on the seal plate at least partially perpendicular to the circumferential ridge. The method also includes cutting through the seal plate along the cutting guide and along the circumferential groove. The method also includes forming an aperture in the seal plate by removing the removable panel from the seal plate; and passing a pipe through the aperture formed in the seal plate.

In some variations, passing the pipe through the seal plate causes at least one of the frustoconical wall and the seal plate to flex. Additionally, the method includes exerting an inward sealing force on the pipe in response to flexure of the at least one of the frustoconical wall and the seal plate.

In other variations, the removable panel is a first removable panel and the seal plate further including a second removable panel disposed within an area of the first removable panel, each of the first and second removable panels including a circumferential groove, circumferential ridge, and scoring line; and wherein removing the first removable panel includes cutting a scoring line and a circumferential groove circumscribing the first removable panel and removing the second removable panel includes cutting a scoring line and a circumferential groove circumscribing the second removable panel. In some examples, the method can include selecting one of the first and second removable panels based on a diameter of the pipe being marginally larger than a diameter of the selected one of the first and second removable panels.

In other variations, cutting through the seal plate along the cutting guide includes cutting through the seal plate linearly adjacent a linear rib of the cutting guide; and cutting through the seal plate along a curved rib of the cutting guide, wherein the curved rib transitions the knife into cutting through the seal plate along the circumferential groove. Additionally, removing the removable panel includes separating the seal plate from the frustoconical wall.

In some aspects, disclosed herein is a seal component, including a cylindrical wall and a frustoconical wall extending inwardly from the cylindrical wall. The seal component also includes a seal plate enclosing the frustoconical wall, the seal plate including a first removable panel and a second removable panel. The second removable panel is disposed within an area of the first removable panel. The seal component also includes a cutting guide at least partially perpendicular to a perimeter of the first and second removable panels. The seal component also includes a circumferential ridge circumscribing the second removable panel, the circumferential ridge integrally formed with the seal plate and removably coupled with at least the second removable panel. Additionally, the seal component also includes a circumferential groove adjacent the circumferential ridge, wherein the circumferential groove is inwardly disposed relative to the circumferential ridge.

In some variations, each of the first and second removable panels is circular and not coaxial. Additionally, the circumferential groove can be a rectangular notch. Further, the seal plate can be integrally formed with the frustoconical wall. Additionally, the seal component can further include a circumferential groove disposed between the seal plate and the frustoconical wall.

BRIEF DESCRIPTION OF THE SEVERAL VIEWS OF THE DRAWING

The present disclosure is described in the following detailed description in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENTS

This invention relates to pipe seal components for use in the walls of underground, on-site waste disposal units, such as poured concrete or plastic septic tanks, drop boxes, distribution boxes, and the like. Most commonly, such seal components are used to seal and accommodate a drain pipe which is inserted therethrough to communicate with the interior of the tank or box.

Figure 10:
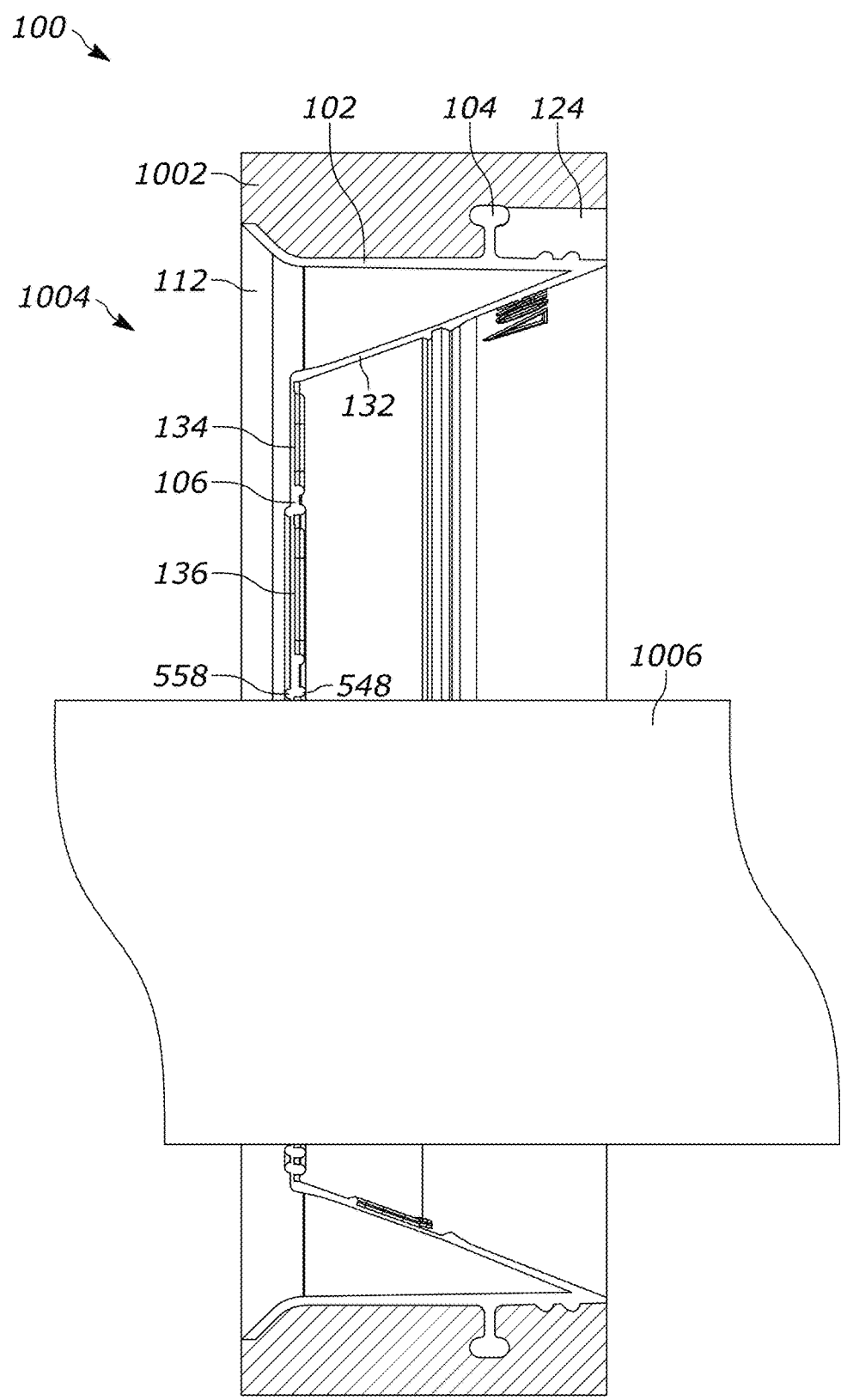
FIG. 10 is a cross-sectional view of the seal component of FIGS. 1-9 coupled with a pipe in accordance with the present disclosure.

FIGS. 1-4 illustrate a seal component 100 made in accordance with the present disclosure and configured to provide a better seal as compared to earlier seal components. The seal component 100 generally includes a cylindrical wall 102 having a circumferential flange 104 and a seal plate 106 disposed on a frustoconical wall 108. The seal component 100 is configured to be disposed in an aperture of a wall of a septic tank, drop box, and/or distribution box. In the present example, the seal component 100 is configured to be poured in place in the wall (as shown in FIG. 10). In other examples, the cylindrical wall 102 is configured to be coupled to a wall of a septic tank, drop box, and/or distribution box made in a different way (e.g., adhesive and screw coupling to a plastic tank/box).

The cylindrical wall 102 is generally cylindrical, but includes the circumferential flange 104 extending outwardly from the cylindrical wall 102. The circumferential flange 104 secures the seal component 100 in the wall (shown in greater detail in FIGS. 6 and 10). The cylindrical wall 102 also includes a circular flange 112 and ribs 114. Similar to the circumferential flange 104, the circular flange 112 and the ribs 114 engage the wall and limit axial movement of the seal assembly.

The cylindrical wall 102 further includes indicating means 122 extending from a top-most portion of the cylindrical wall. The indicating means 122 identifies a top of the seal component 100. The indicating means 122 may include two tabs 124. The tabs 124 are perpendicular to the circumferential flange 104 and, when disposed in the wall, limit rotational movement of the seal component 100. The tabs 124 facilitate ease in installation of the seal component 100 when assembled in a poured-in concrete wall.

The seal plate 106 encloses and seals the frustoconical wall 108. In the present example, the seal plate 106 is integrally formed with the frustoconical wall 108. For example, the seal plate 106 and the frustoconical wall 108 can be monolithically manufactured (e.g., plastic mold injected) in the same manufacturing operation. As a result, the seal plate 106 and frustoconical wall 108 form a watertight seal within the cylindrical wall 102. In other examples, the seal plate 106 can be secured to the frustoconical wall 108 via adhesive, mechanical fastener, welding, or other watertight joining means. In the present example, the seal plate 106 and the frustoconical wall 108 are made from a flexible polymer.

Figure 1:
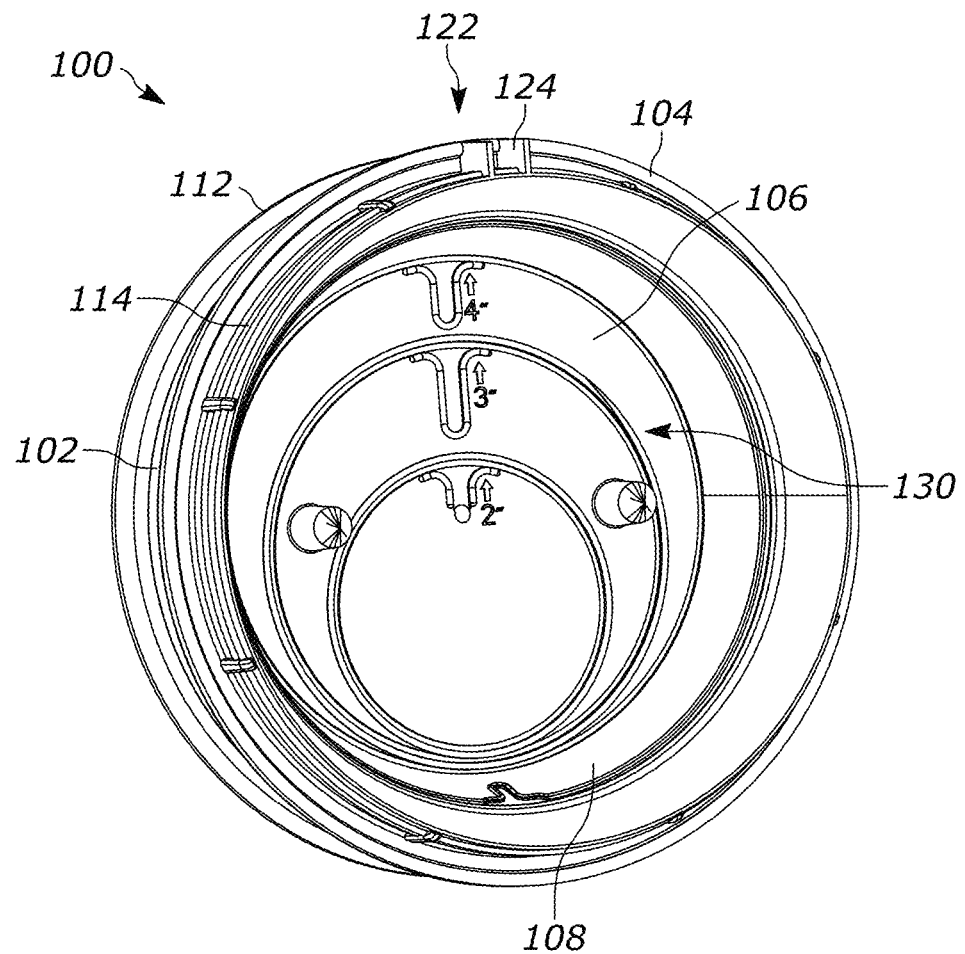
FIG. 1 is a perspective front view of seal component made in accordance with the present disclosure.
Figure 2:
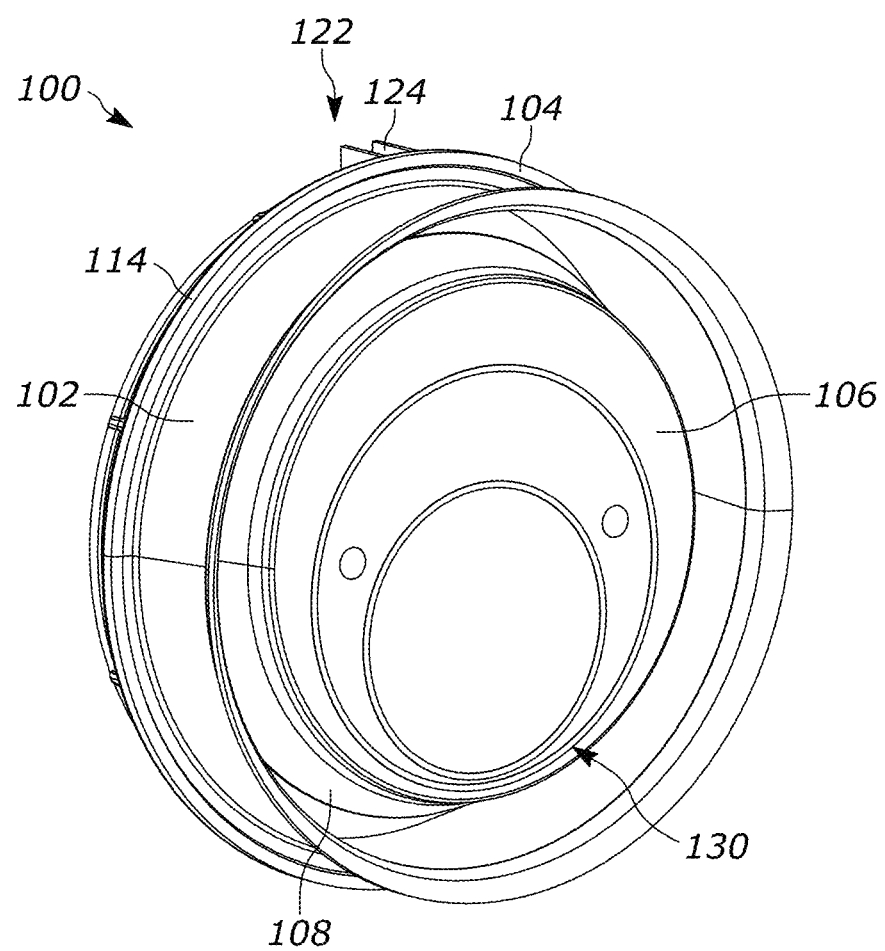
FIG. 2 is a perspective back view of the seal component of FIG. 1.
Figure 3:
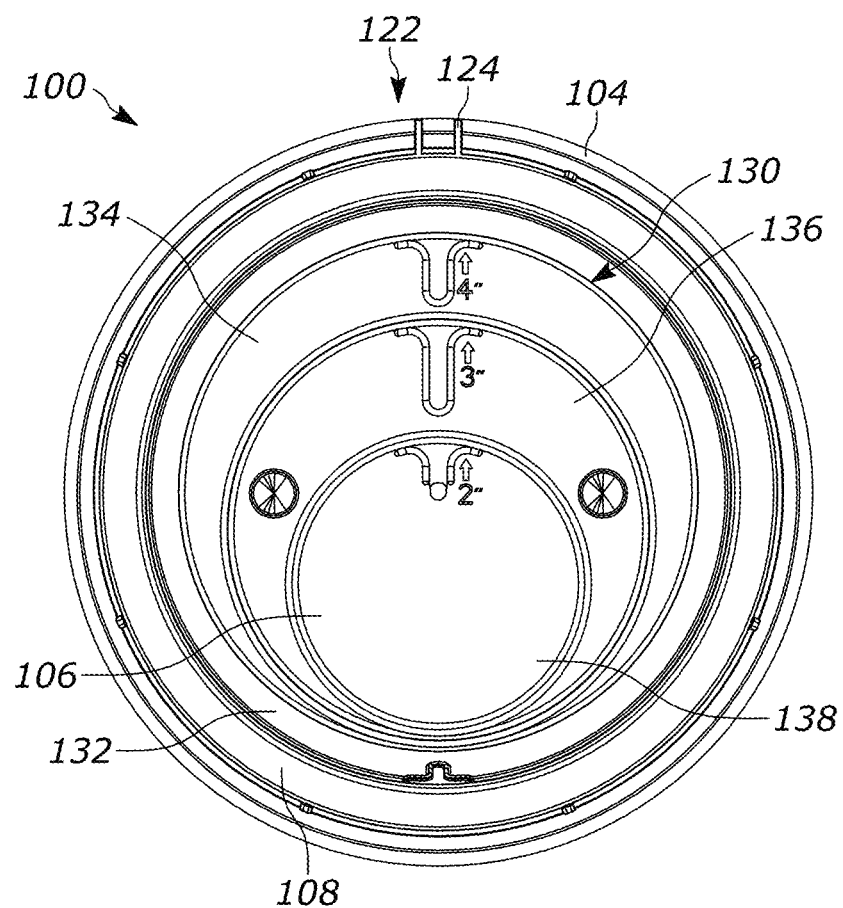
FIG. 3 is a front view of the seal component of FIGS. 1-2.
Figure 4:
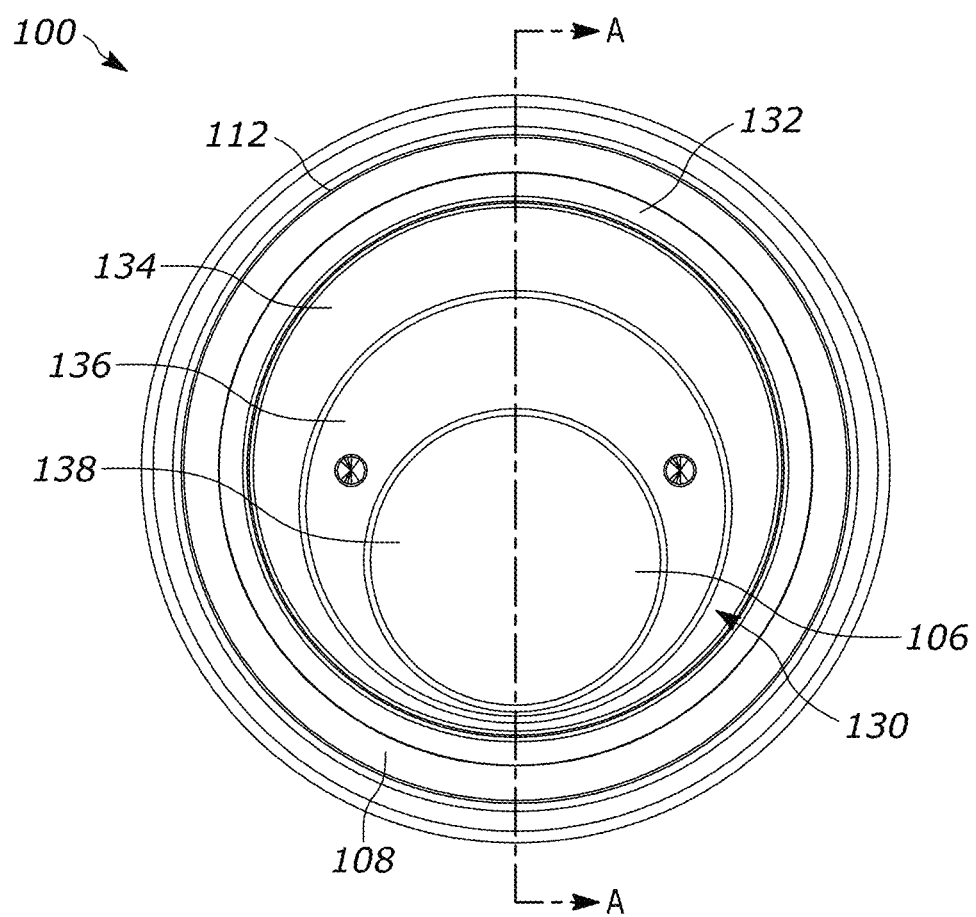
FIG. 4 is a back view of the seal component of FIGS. 1-3.

As shown in FIGS. 3 and 4, the seal plate 106 includes removable panels 130. Specifically, the frustoconical wall 108 includes a first removable panel 132 and the seal plate includes a second removable panel 134, a third removable panel 136, and a fourth removable panel 138. Each of the first, second, third, and fourth removable panels 132, 134, 136, 138 are superimposed. For example, the third removable panel 136 is disposed within an area of the second removable panel 134. Also, the second removable panel 134 is disposed within an area of the first removable panel 132. In the present example, the second, third, and fourth removable panels 134, 136, 138 are not coaxial. But in other examples, the second, third, and fourth removable panels 134, 136, 138 can be coaxial or disposed adjacent each other. As will be discussed in greater detail in connection with FIGS. 6 and 7, one or more of the removable panels 130 can be separated from the seal plate 106 to facilitate insertion of a pipe (as shown in FIG. 10).

The removable panels 130 are circular, and each defines a radius and perimeter (i.e., circumference). The first removable panel 132 is the same size as the seal plate 106. The second removable panel 134 is smaller than the first removable panel 132 and is approximately tangential to the first removable panel 132. Additionally, the third removable panel 136 is smaller than the second removable panel 134 and is approximately tangential to the second removable panel 134. In the present example, the removable panels 130 are approximately tangential at the bottom of the seal plate 106 (opposite the indicating means 122). By eccentrically biasing the removable panels 130 toward the bottom of the seal component 100, the removable panels 130 can better facilitate draining of an underground waste disposal unit (e.g., a septic tank, distribution box). In other examples, the removable panels 130 can be nested in a different arrangement. In yet other examples, the removable panels 130 could be disposed on the seal plate 106 and frustoconical wall 108 in a non-nesting arrangement.

Figure 5:
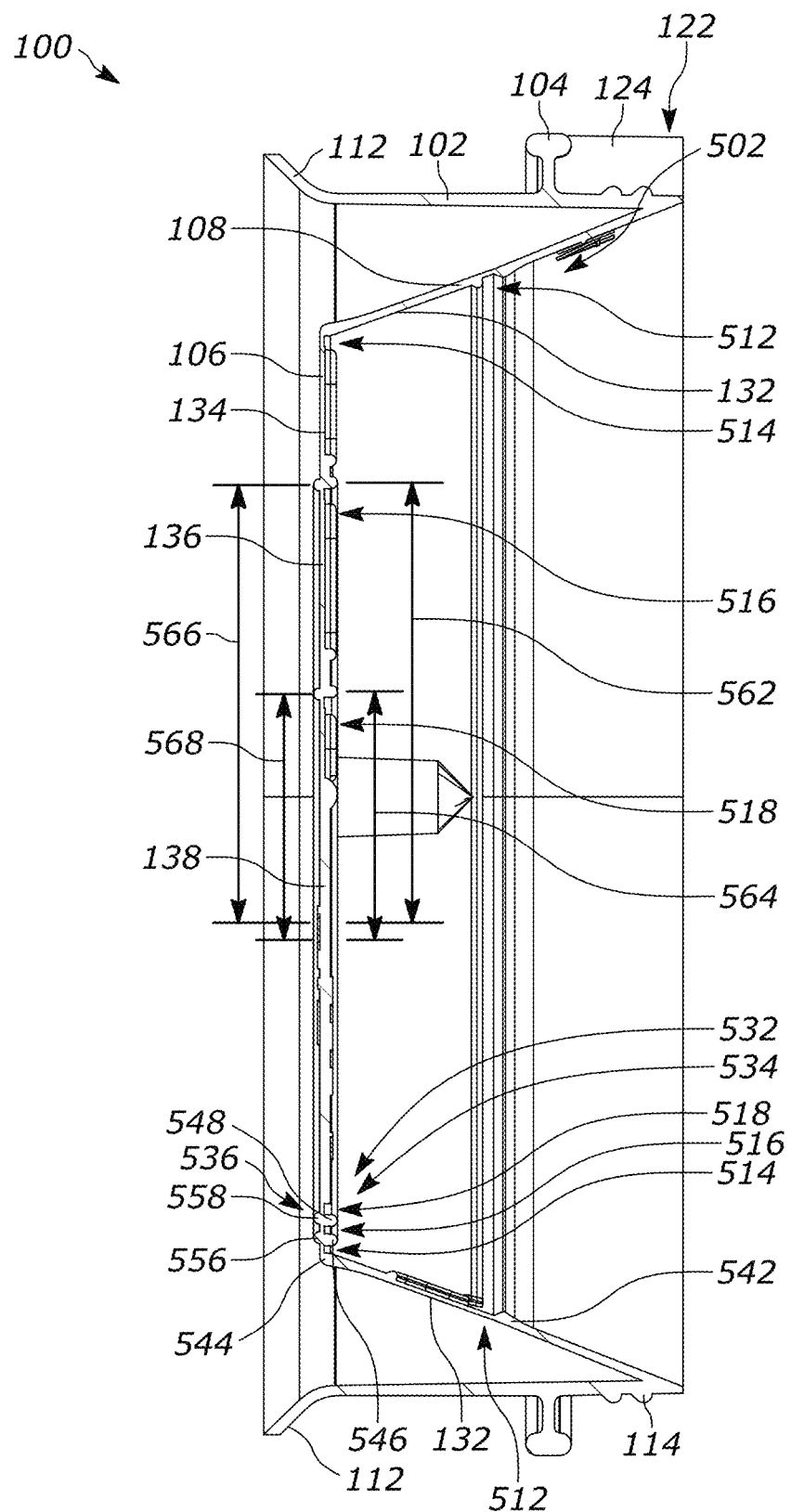
FIG. 5 is a cross-sectional view of the seal component of FIGS. 1-4.
Figure 6:
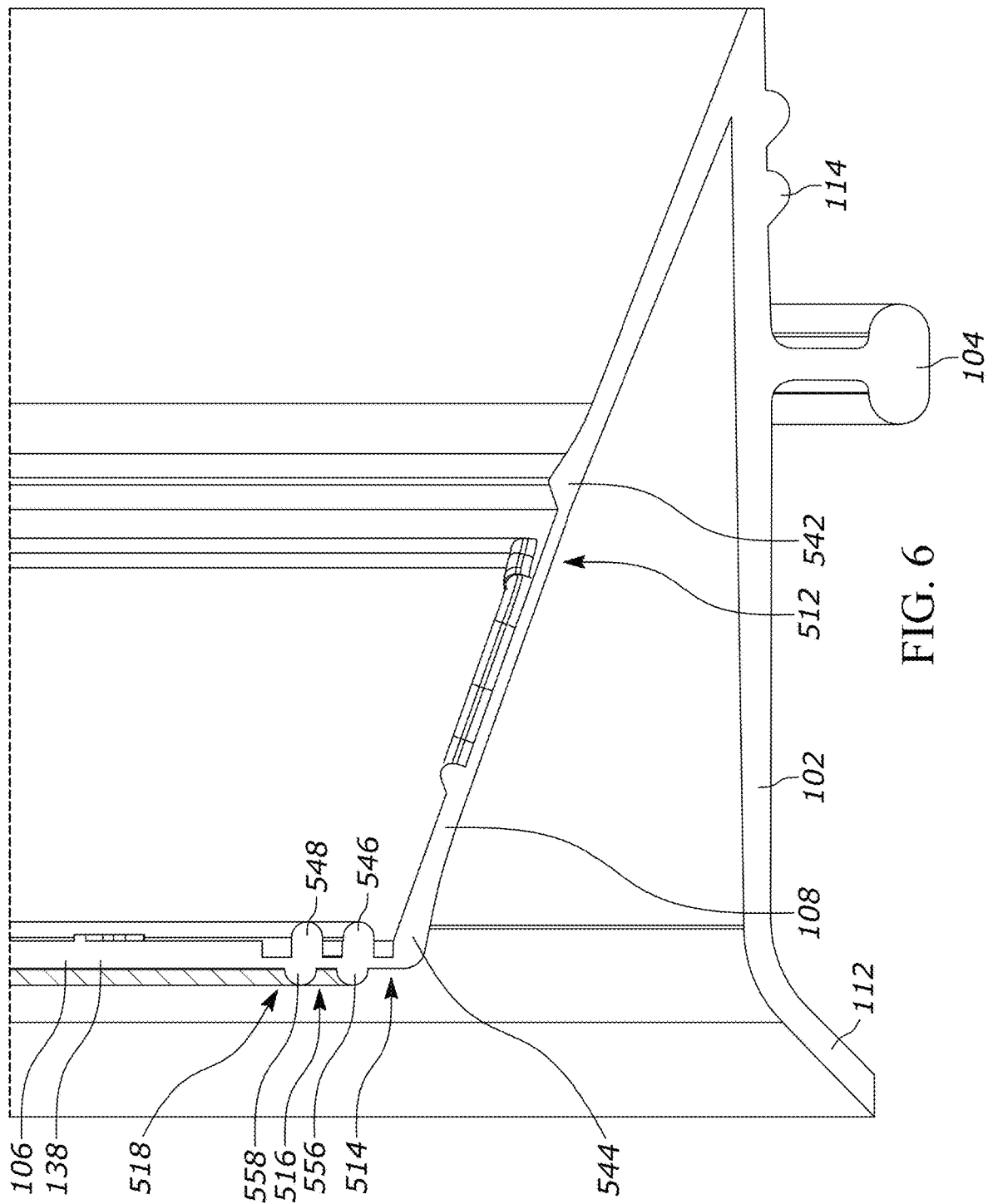
FIG. 6 is a partial cross-sectional view of the seal component of FIGS. 1-5.

As shown in FIGS. 5 and 6, the seal plate 106 and the frustoconical wall 108 include circumferential grooves 502. The first removable panel 132 is defined by the first circumferential groove 512, the second removable panel 134 is defined by the second circumferential groove 514, the third removable panel 136 is defined by the third circumferential groove 516 and the fourth removable panel 138 is defined by the fourth circumferential groove 518. Each of the circumferential grooves 502 is a rectangular notch (in cross-section) at least partially disposed in the seal plate 106. Each of the removable panels 130 can be separated from the seal plate 106 by tearing or cutting the corresponding one of the circumferential grooves 502. In the present example, the circumferential grooves 502 extend approximately halfway through the thickness of the seal plate 106, but in other examples, could extend deeper or shallower into the seal plate 106. Further, the circumferential grooves 502 can be differently shaped in cross section, such as V-shaped, U-shaped, pentagonal, etc. The circumferential grooves 502 facilitate separating the corresponding removable panels 130 from the seal plate 106 by weakening the strength of the seal plate 106 along a circumference of the removable panels 130.

The seal plate 106 includes circumferential ridges 532. The circumferential ridges 532 include a first set of circumferential ridges 534 and a second set of circumferential ridges 536. The first set of circumferential ridges 534 includes a first wall portion 542, a second wall portion 544, a third circumferential ridge 546, and a fourth circumferential ridge 548. Each of the first set of circumferential ridges 534 is disposed adjacent the circumferential grooves 502. Specifically, the first wall portion 542 is disposed adjacent the first circumferential groove 512, the second wall portion 544 is disposed adjacent the second circumferential groove 514, the third circumferential ridge 546 is disposed between the second circumferential groove 514 and the third circumferential groove 516, and the fourth circumferential ridge 548 is disposed between third circumferential groove 516 and the fourth circumferential groove 518.

The second set of circumferential ridges 536 includes a fifth circumferential ridge 556 and a sixth circumferential ridge 558. The fifth and sixth circumferential ridges 556, 558 are disposed on an opposite side of the seal plate 106 relative to the third and fourth circumferential ridges 546, 548. As shown in greater detail in FIG. 6, the fifth circumferential ridge 556 is disposed partially misaligned with the third circumferential ridge 546 and the sixth circumferential ridge 558 is disposed partially misaligned with the fourth circumferential ridge 548. In the present example, the first wall portion 542 and the second wall portion 544 are integral with the frustoconical wall 108 and the third, fourth, fifth, and sixth circumferential ridges 546, 548, 556, 558 are integrally formed with the seal plate 106. The first wall portion 542 and the second wall portion 544 are thicker portions of the frustoconical wall 108 and in various examples may have a semicircular, elliptical, parabolic, or another cross-sectional shape. Similarly, the third, fourth, fifth, and sixth circumferential ridges 546, 548, 556, 558 are approximately semicircular in cross-sectional shape, but can be any other cross-sectional shape. The circumferential ridges 532 protect the seal plate 106 and frustoconical wall 108 from being improperly cut when a select one of the removable panels 130 is removed from the seal component 100. For example, when removing the fourth removable panel 138, a knife will not cut through the fourth circumferential ridge 548 and not damage the third removable panel 136.

The third circumferential ridge 546 defines a first radius 562 and the fourth circumferential ridge 548 defines a second radius 564. Similarly, the fifth circumferential ridge 556 defines a third radius 566 and the sixth circumferential ridge 558 defines a fourth radius 568. The first radius 562 is longer than the third radius 566 and the second radius 564 is longer than the sixth radius 568, defining the misalignment of the first set of circumferential ridges 534 and the second set of circumferential ridges 536. As a result, the first set of circumferential ridges 534 are misaligned with the second set of circumferential ridges 536 to facilitate sealing with a pipe (as described in greater detail in connection with FIG. 10). Further, the misaligned first and second set of circumferential ridges 534, 536 facilitate cutting only partway through the corresponding circumferential groove 502.

When one of the removable panels 130 is removed from the seal plate 106 along the corresponding circumferential groove 502, the corresponding one of the circumferential ridges 532 remains on the seal plate 106 and/or frustoconical wall 108. The circumferential ridges 532 circumscribe the opening defined by the portion of the removable panel (e.g., removable panel 136) that is removed. As will be described in greater detail in connection with FIG. 10, the circumferential ridges 532 add rigidity to the frustoconical wall 108 and/or seal plate 106 when one of the removable panels 130 is removed.

Figure 7:
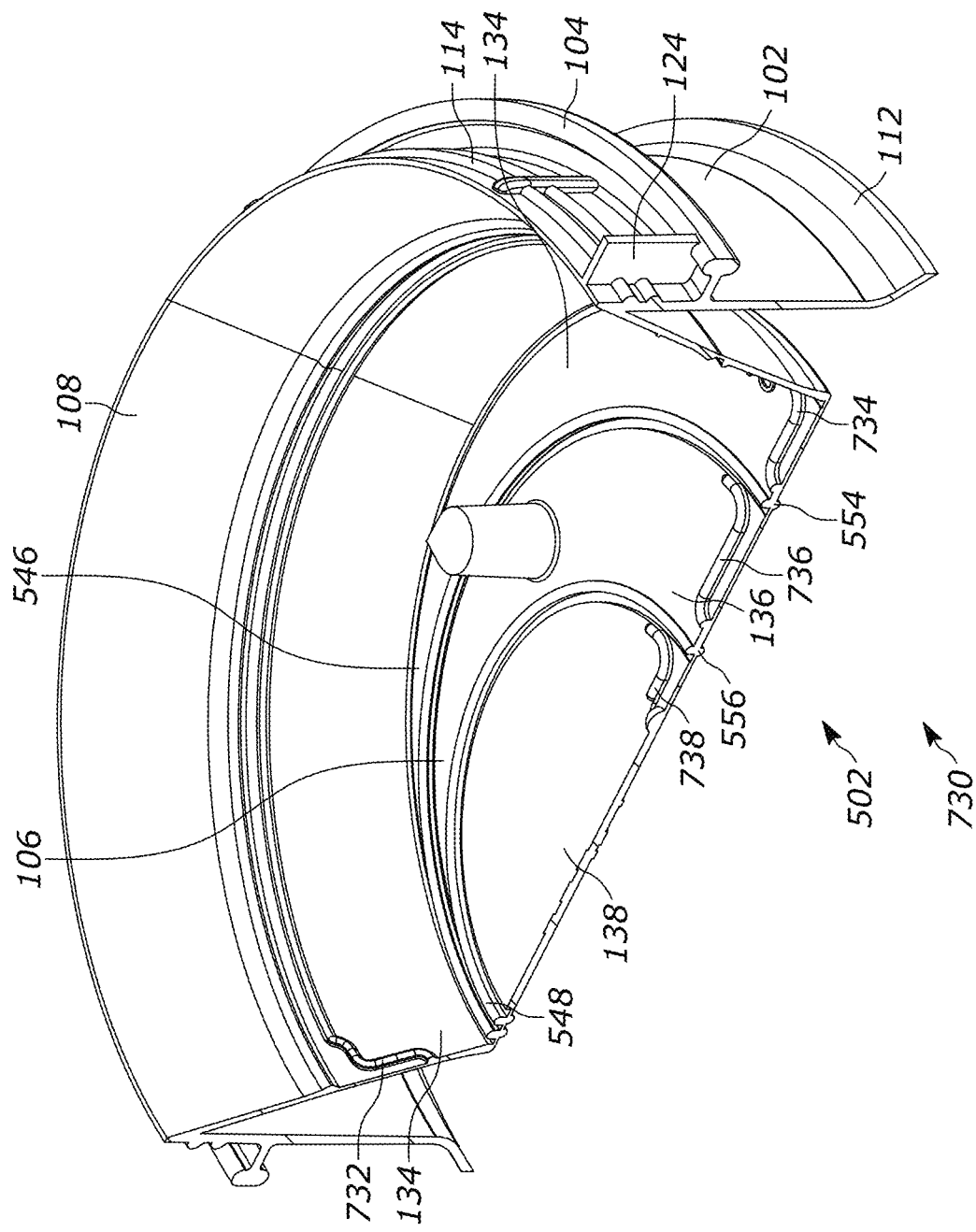
FIG. 7 is a perspective cross-section of the seal component of FIGS. 1-6.

As illustrated in FIG. 7, each one of the removable panels 130 includes cutting guides 730. The first removable panel 132 of the seal plate 106 includes a first cutting guide 732, the second removable panel 134 includes a second cutting guide 734, the third removable panel 136 includes a third cutting guide 736, and the fourth removable panel 138 includes a fourth cutting guide 738. The cutting guides 730 define a raised rib disposed on the seal plate 106 or the frustoconical wall 108. The cutting guides 730 are configured to guide a knife blade into an associated one of the circumferential grooves 502. As will be discussed in greater detail in connection with FIGS. 8 and 9, the shape of the raised rib includes a curved surface to guide the knife blade into the corresponding one of the circumferential grooves 502.

Figure 8:
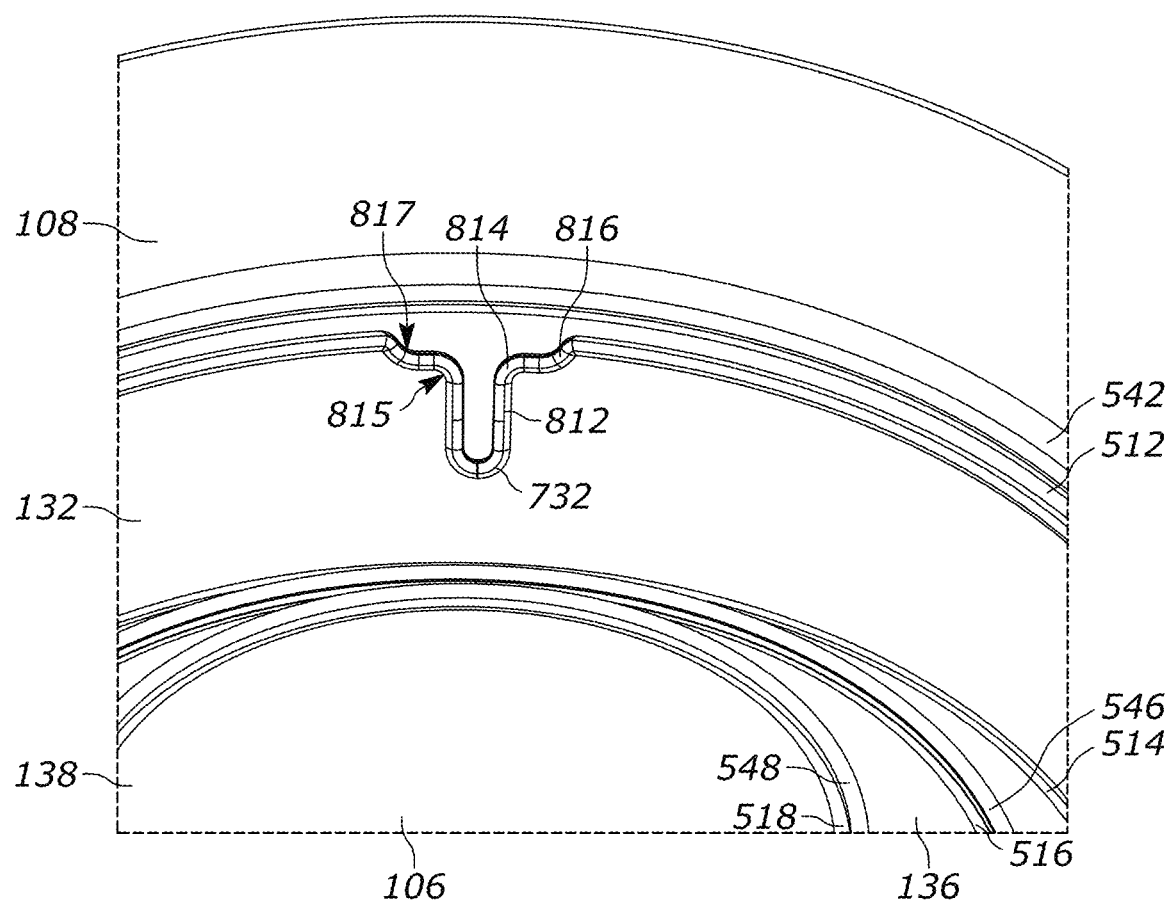
FIG. 8 is a first partial view the seal component of FIGS. 1-7.

FIG. 8 illustrates the first cutting guide 732 in greater detail. As shown in FIG. 8, the first cutting guide 732 includes linear ribs 812, first curved ribs 814, and second curved ribs 816. Each of the linear ribs 812, first curved ribs 814, and second curved ribs 816 are configured to guide a knife blade into the circumferential groove 512. In one example, a knife blade would cut through the seal plate 106 between the linear ribs 812 and the cutting edge of the knife is pushed parallel with one of the linear ribs 812 until the knife blade follows the curved surfaces of the curved ribs 814, 816. As shown in FIG. 8, the first curved ribs 814 define a first radius of curvature 815 and the second curved ribs 816 define a second radius of curvature 817. The first and second radius of curvature 824, 826 are large enough to facilitate a knife blade following the edge of the curved ribs 814, 816.

Figure 9:
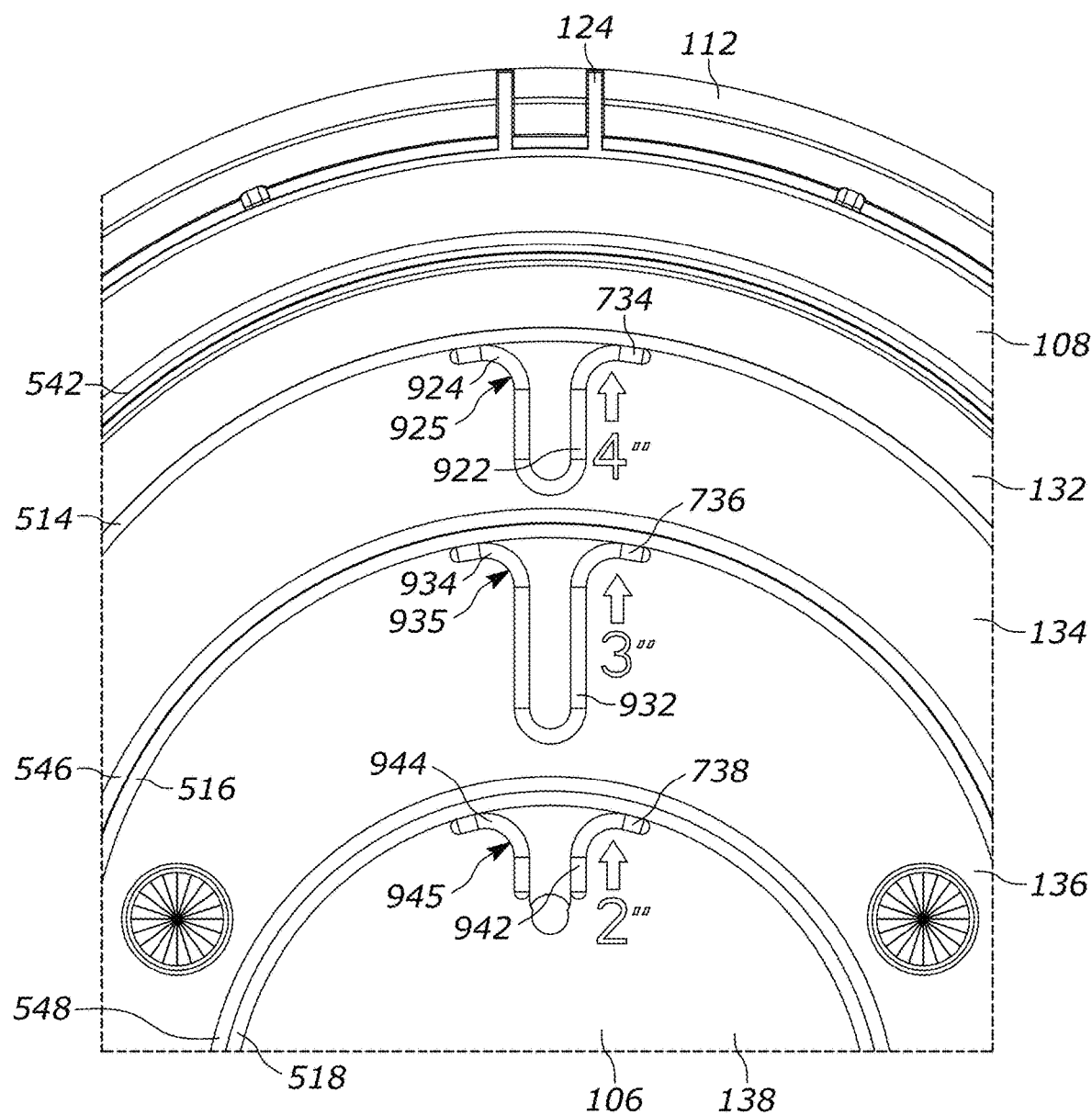
FIG. 9 is a second partial view of the seal component of FIGS. 1-8.

FIG. 9 illustrates the second, third, and fourth cutting guides 734, 736, 738 in greater detail. Similar to the first cutting guide 732, the second, third, and fourth cutting guides 734, 736, 738 include linear ribs 922, 932, 942 respectively. Additionally, each of the second, third, and fourth cutting guides 734, 736, 738 includes curved ribs 924, 934, 944. The curved ribs 924, 934, 944 define radii of curvature 925, 935, 945, respectively. Similar to the first cutting guide 732, a knife blade can cut through the seal plate 106 between the linear ribs (e.g., one of linear ribs 922, 932, 942) and guided along one of the corresponding curved ribs (e.g., curved ribs 924, 934, 944) and into the corresponding one of the circumferential grooves 502. The radii of curvature 925, 935, 945 are configured to facilitate the knife blade following the curved ribs 924, 934, 944 into the corresponding one of the circumferential grooves 502. In the present example, the radii of curvature 925, 935, 945 are identical, but in other examples, the radii of curvature 925, 935, 945 could be different for each one of the cutting guides 730.

Each of the cutting guides 730 and circumferential ridges 532 has a generally semi-circular cross-sectional shape (shown in greater detail in FIG. 5). In other examples, the circumferential ridges 532 and the cutting guides 730 can be differently shaped (e.g., triangular, trapezoidal, oblong, obround, semi-elliptical). The cross-sectional shape of the cutting guides 730 help guide a knife blade into the corresponding one of the circumferential grooves 502. Additionally, the cross-sectional shape of the circumferential ridges 532 increases the rigidity of the circumferential ridges and facilitates forming a sealing surface (described in greater detail in connection with FIG. 10).

As illustrated in FIG. 10, the seal component 100 is secured in a wall 1002. The seal component 100 is disposed in an aperture 1004 of the wall. In some examples, the concrete is poured around the cylindrical wall 102 and the seal component forms the aperture 1004. In such an example, the concrete engages cylindrical wall 102 and at least partially encases the circumferential flange 104 such that the seal component 100 is restricted from movement in any direction. The circumferential flange is generally T-shaped and extends around the circumference of the cylindrical wall 102. But, in various examples, the circumferential flange 104 can be shaped differently than a flange (e.g., V-shaped, acutely angled web relative to cylindrical wall 102, circumferential Z-clip). In some other examples, the seal component 100 is inserted into the wall 802 having an aperture 1004 formed in a different manner (e.g., concrete wall poured around an insert, aperture 1004 drilled out from the wall 1002).

When the seal component 100 is properly secured in the wall, one of the removable panels 130 can be removed from the seal plate 106. As shown in FIG. 10, the fourth removable panel 138 is removed from the seal plate 106. After the fourth removable panel 138 is removed from the seal plate 106, a pipe 1006 is inserted into the opening disposed in the seal plate 106. In the present example, inserting the pipe 1006 causes the seal plate 106 and the frustoconical wall 108 to flex (not shown in FIG. 10). The flexing of the seal plate 106 and the frustoconical wall 108 creates an inward force on the pipe 1006. In the present example, the circumferential ridges 532 add rigidity to the seal plate 106 and frustoconical wall 108. The rigidity of the seal plate 106 and the frustoconical wall 108 increase the inward force on the pipe 1006 and further ensure the seal plate 106 and the frustoconical wall 108 form a watertight seal around the pipe 1006. Furthermore, because the cutting guides 730 bias the knife blade to cut the innermost portion of the circumferential grooves 502, the outermost portion of the circumferential grooves 502 operates like a flexible, sealing wiper blade to further improve the seal about the pipe 1006.

Figure 11:
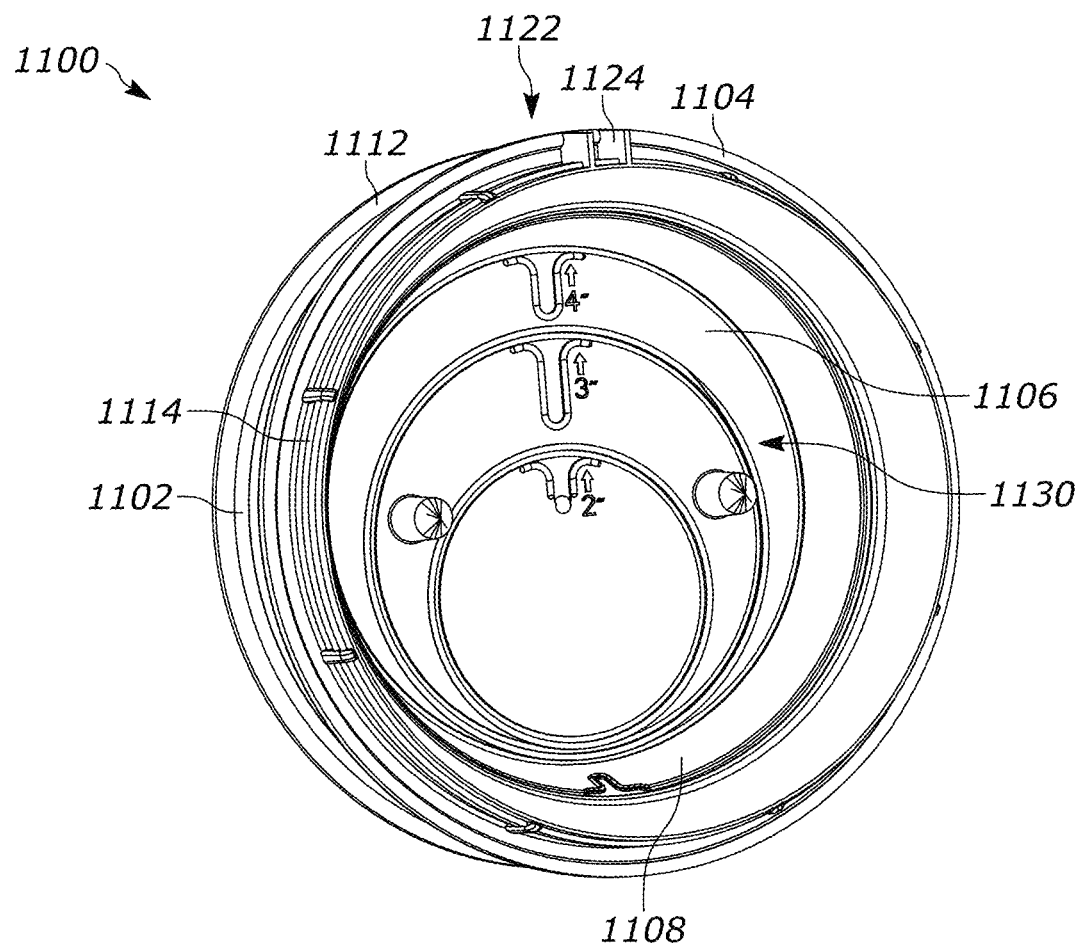
FIG. 11 is a perspective front view of a second seal component made in accordance with the present disclosure.
Figure 12:
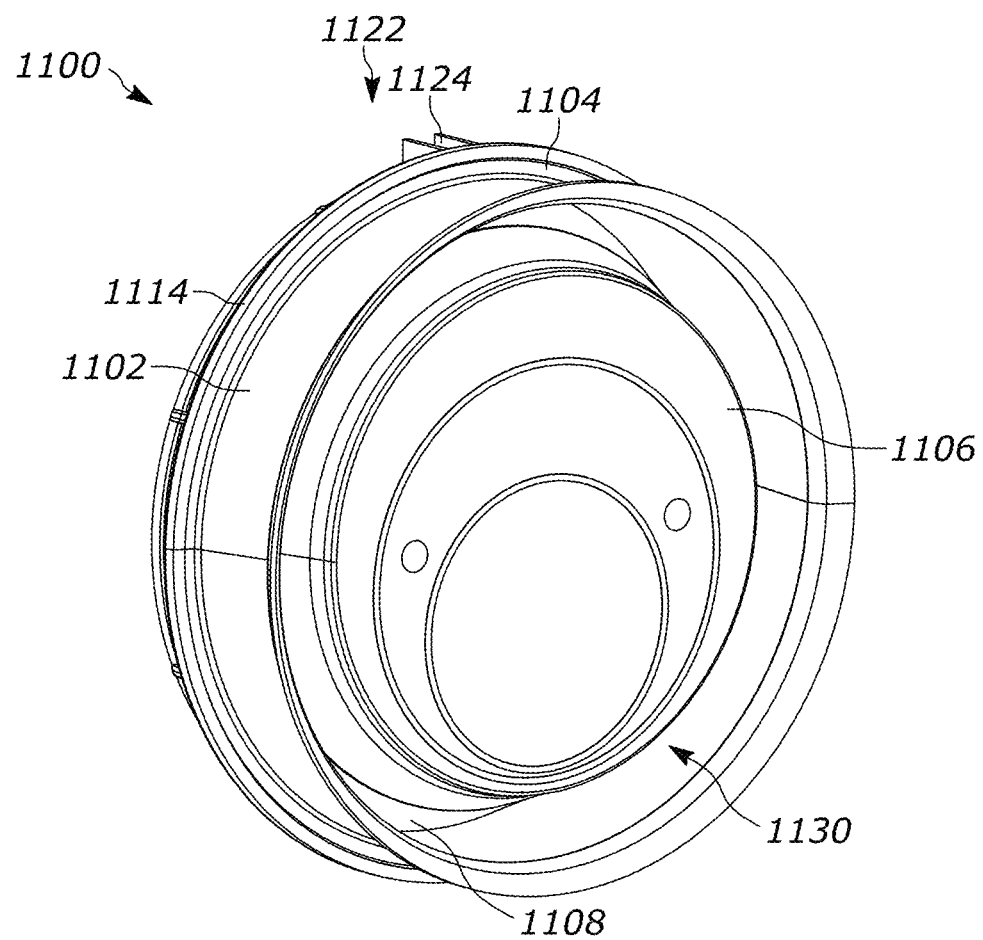
FIG. 12 is a perspective back view of the seal component of FIG. 11.

FIGS. 11-12 illustrate an alternative sealing component 1100 made in accordance with the present disclosure. The sealing component 1100 is similar to the sealing component 100. Similar to the sealing component 100, the sealing component 1100 includes a circumferential wall 1102 having a circumferential flange 1104 and a seal plate 1106 disposed on a frustoconical wall 1108. As shown in FIGS. 11-15, the circumferential wall 1102, circumferential flange 1104, seal plate 1106, and frustoconical wall 1108 are substantially identical to the corresponding aspects of the sealing component 100. For example, the seal components 100, 1100 may include identical tabs 124, 1124 and ribs 114, 1114. The sealing component 1100 differs from the sealing component 100 because the sealing component 1100 includes scoring lines 1430 (discussed in greater detail below) instead of the cutting guides 730. Additionally, the circumferential grooves 1302 and circumferential ridges 1332 are differently configured on the sealing component 1100.

Figure 13:
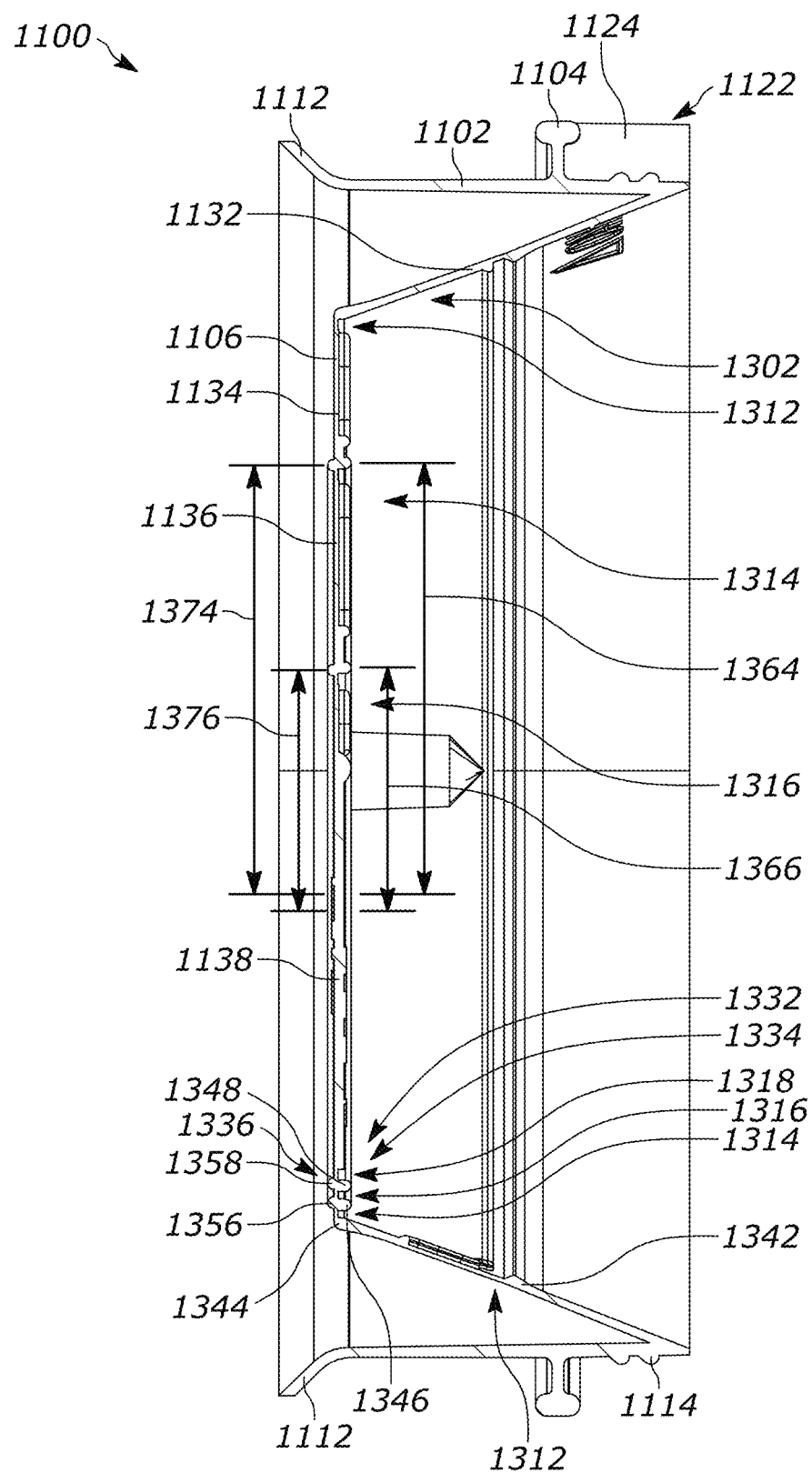
FIG. 13 is a cross-sectional view of the seal component of FIGS. 11-12.
Figure 14:
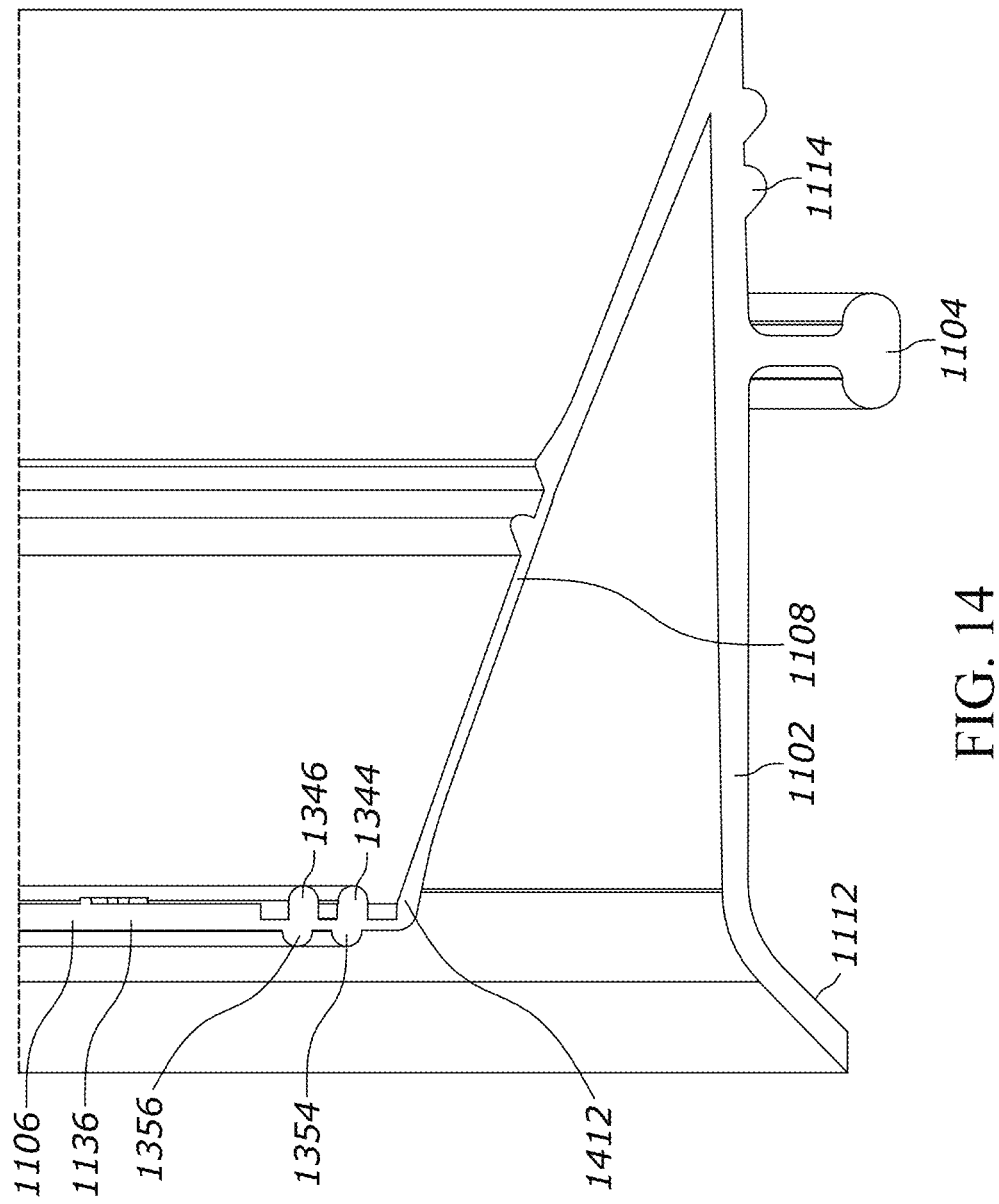
FIG. 14 is a partial cross-sectional view of the seal component of FIGS. 11-13.

The sealing component 1100 includes removable panels 1130. As shown in FIG. 13, the removable panels include a first, second, third, and fourth removable panel 1132, 1334, 1136, 1138. The first, second, third, and fourth removable panels 1132, 1134, 1136, 1138 are arranged identically to the first, second, third, and fourth removable panels 1132, 1134, 1136, 1138 as discussed above. Each of the first, second, third, and fourth removable panels 1132, 1134, 1136, 1138 are circumscribed by the corresponding one of the circumferential grooves 1302 (e.g., first, second, third, and fourth circumferential grooves 1312, 1314, 1316, 1318) and the corresponding circumferential ridges 1332 (e.g., first and second wall portions 1342, 1344, and third and fourth circumferential ridges 1346, 1348).

In contrast to the circumferential grooves 502, the circumferential grooves 1302 are V-shaped grooves. In some examples, the V-shaped groove is shaped to correspond to the edge of a knife blade. As a result, the knife is less likely to leave any of the circumferential grooves 1302. Additionally, as better shown in FIG. 14, the third and fourth circumferential ridges 1346, 1348 are rounded trapezoidal shapes when viewed in cross-section. As discussed above, the circumferential ridges 1332 can have any cross-sectional shape.

Figure 15:
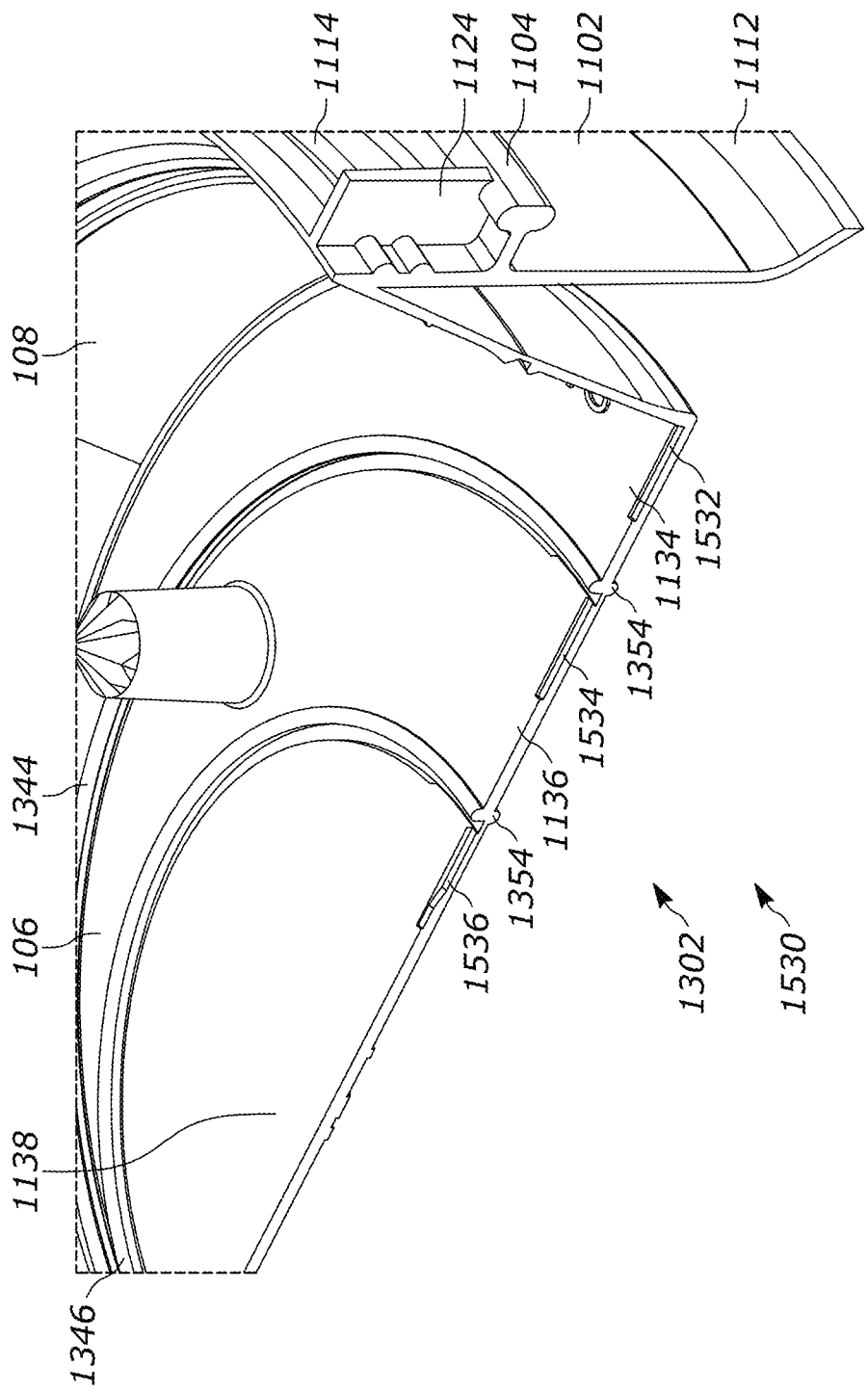
FIG. 15 is a partial perspective, sectional view of the seal component of FIGS. 11-14.

As shown in FIG. 15, each of the removable panels 1130 includes linear scoring lines 1530. The second removable panel 1134 includes a scoring line 1534, the third removable panel 1136 includes a scoring line 1536, and the fourth removable panel 1138 includes a scoring line 1538. The scoring lines 1530 define channels partially disposed in the seal plate 1106. Additionally, the scoring lines 1530 are disposed perpendicular to the circumferential grooves 1302. In the present example, the scoring lines 1530 are linear, but in other examples, the scoring lines 1530 could be curved or differently angled relative to the circumferential grooves 1302 to guide the knife into the circumferential grooves 1302. The scoring lines 1530 can be cut with a utility knife to remove one of the corresponding removable panels 1130. By cutting the corresponding one of the scoring lines 1530, there is less risk of damaging the opening formed by removing the corresponding removable panel of the removable panels 1130.

Additionally, the circumferential ridges 532 and circumferential grooves 502 can cooperate with the scoring lines 730 to provide a cutting guide for the utility knife. The circumferential grooves 502 and scoring lines 730 provide channels in the seal plate in which the knife can cut through and discourage the knife from cutting the seal plate other than through the circumferential grooves 502 and scoring lines 730. In such an example, the utility knife cuts along the circumferential groove (e.g., third circumferential groove 516) and the additional material of the circumferential ridge (e.g., third circumferential ridge 546) resists the utility knife cutting through the circumferential ridge 546. As a result, the circumferential ridges 532 facilitate removing a removable panel (e.g., third removable panel 136) while ensuring a watertight, circular opening. Additionally, while a removable panel should be cut radially inward along the scoring lines 730, if the utility knife cuts one of the scoring lines 730 radially outwardly, the knife will be stopped when contacting a corresponding one of the circumferential ridges 730.

As discussed above, in connection with FIGS. 13 and 14, the first set of circumferential ridges 1334 are radially misaligned with the second set of circumferential ridges 1336. When the pipe (e.g., pipe 1006) is passed through the seal plate 1106, the angle of the seal plate 1106 corresponds to the angular misalignment of the first and second sets of circumferential ridges 1334, 1336. As a result, the circumferential ridges 1332 engage the pipe 1006 along a greater length, further improving the seal between the circumferential ridges 1332 and the pipe.

The seal components 100, 1100, as described herein, provides several benefits over other seal components. Among other features, the combination of the circumferential grooves 502, the circumferential ridges 532, and the cutting guides 730 reduces the likelihood of cutting or damaging one or more of the removable panels (e.g., removable panels 130).

First, the cutting guides 730 and scoring lines 1530 facilitate cutting one of the removable panels 130, 1130. Each of the cutting guides 730 and scoring lines 1530 guides a knife into the circumferential grooves 502, 1130 and reduces the likelihood of a knife blade damaging the seal component 100, 1000. The cutting guides 730 include curved ribs to transition the knife blade into the circumferential grooves 502. Alternatively, the scoring lines 1530 provide a thinner seal plate 1106 portion to reduce the resistance of the knife blade cutting through the seal plate 1106. In some examples, the scoring line can be modified to include the cutting guide.

Second, the circumferential ridges 532 add rigidity to the seal plate 106 and the flexible frustoconical wall 108. The increased rigidity increases a sealing force between the seal component 100 and the pipe 806. The increased sealing force reduces or prevents leakage through the interface between the pipe 806 and the seal component 100. Without the circumferential ridges 532, the seal plate 106 and/or the frustoconical wall 108 may not provide enough inwardly directed sealing force on the pipe 806. As a result, the seal component 100, even when properly installed in the wall 802, would result in leakage around the pipe 806.

Third, the cylindrical wall 102 includes the circumferential flange 104, circular flange 112, ribs 114, and indicating means 122 work together to facilitate installation in a septic tank or distribution box. In the present example, the seal component 100 can be installed in a concrete wall 802 as the wall 802 is poured in. In other examples, the features of the cylindrical wall 102 also facilitate insertion into other walls (e.g., polymer).

Fourth, the removable panels 130 being nested but not coaxial facilitates draining the tank or box the seal component 100 is disposed on. The removable panels 130 are eccentrically biased toward the bottom end of the seal component 100 and facilitate draining at lower liquid levels in the tank or box.

Those skilled in the art will recognize that a wide variety of modifications, alterations, and combinations can be made with respect to the above described examples without departing from the spirit and scope of the invention(s) disclosed herein, and that such modifications, alterations, and combinations are to be viewed as being within the ambit of the inventive concept(s).

What is claimed is:

1. A seal component, comprising:
a cylindrical wall;
a frustoconical wall extending inwardly from the cylindrical wall;
a generally planar seal plate enclosing an inner end of the frustoconical wall, the seal plate including a first removable panel, a second removable panel, and a third removable panel, the third removable panel disposed within an area of the second removable panel and the second removable panel disposed within an area of the first removable panel;
a primary circumferential ridge circumscribing the second removable panel, the primary circumferential ridge integrally formed with the seal plate and removably coupled with at least the second removable panel, wherein the primary circumferential ridge includes a first circumferential ridge disposed on a first side of the seal plate immediately outboard of a reduced-thickness groove at a perimeter of the second removable panel, with an inner wall of the first circumferential ridge extending perpendicularly to the reduced-thickness groove, the primary circumferential ridge further comprising a second circumferential ridge disposed on a second, opposite side of the seal plate, a portion of the second circumferential ridge disposed outboard of the reduced-thickness groove at the perimeter of the second removable panel, the second circumferential ridge having an inner wall perpendicular to the seal plate, and the inner wall of the second circumferential ridge being radially inward of the inner wall of the first circumferential ridge, the second circumferential ridge having a lower height off the second side of the seal plate than a height of the first circumferential ridge off the first side of the seal plate; and
a secondary circumferential ridge circumscribing the third removable panel, the secondary circumferential ridge integrally formed with the seal plate and removably coupled with at least the third removable panel, wherein the secondary circumferential ridge includes a first circumferential ridge disposed on the first side of the seal plate immediately outboard of a reduced-thickness groove at a perimeter of the third removable panel, with an inner wall of the first circumferential ridge extending perpendicularly to the reduced-thickness groove at the perimeter of the third removable panel, the secondary circumferential ridge further comprising a second circumferential ridge disposed on the second side of the seal plate, a portion of the second circumferential ridge of the secondary circumferential ridge disposed outboard of the reduced-thickness groove at the perimeter of the third removable panel, the second circumferential ridge of the secondary circumferential ridge having an inner wall perpendicular to the seal plate, the inner wall of the second circumferential ridge of the secondary circumferential ridge being radially inward of the inner wall of the first circumferential ridge of the secondary circumferential ridge, and the second circumferential ridge of the secondary circumferential ridge having a lower height off the second side of the seal plate than a height of the first circumferential ridge of the secondary circumferential ridge off the first side of the seal plate.

2. The seal component of claim 1, wherein each of the first, second, and third removable panels is circular.

3. The seal component of claim 2, wherein the first, second, and third removable panels are not coaxial.

4. The seal component of claim 1, wherein each of the reduced-thickness grooves has associated therewith a respective cutting guide including a raised rib disposed on the seal plate that leads into, and is configured to guide a blade into, the associated reduced-thickness groove, the raised rib including a linear rib portion and a curved rib portion disposed between the linear rib portion and the associated reduced-thickness groove.

5. The seal component of claim 1, wherein the frustoconical wall is flexible.

6. The seal component of claim 3, wherein a base of each of the first, second, and third removable panels is approximately tangential with one another.

7. A method of using a seal component, comprising:
providing the seal component having a cylindrical wall, a frustoconical wall extending inwardly from the cylindrical wall, a seal plate enclosing the frustoconical wall and including at least a first removable panel, a second removable panel, and a third removable panel, a primary circumferential ridge circumscribing the second removable panel, a first circumferential groove disposed radially inwardly relative to the primary circumferential ridge, and a second removable panel cutting guide on the seal plate at least partially perpendicular to the primary circumferential ridge, the primary circumferential ridge including a first circumferential ridge disposed on a first side of the seal plate immediately outboard of the first circumferential groove, with an inner wall of the first circumferential ridge extending perpendicularly to the circumferential groove, the primary circumferential ridge further comprising a second circumferential ridge disposed on a second, opposite side of the seal plate, a portion of the second circumferential ridge disposed outboard of the reduced-thickness groove at the perimeter of the second removable panel, the second circumferential ridge having an inner wall perpendicular to the seal plate, and the inner wall of the second circumferential ridge being radially inward of the inner wall of the first circumferential ridge, the second circumferential ridge having a lower height off the second side of the seal plate than a height of the first circumferential ridge off the first side of the seal plate, the second removable panel cutting guide including a raised rib disposed on the seal plate that leads into, and configured to guide a blade into, the first circumferential groove, a secondary circumferential rib circumscribing the third removable panel, a second circumferential groove disposed radially inwardly relative to the secondary circumferential ridge, and a third removable panel cutting guide on the seal plate at least partially perpendicular to the secondary circumferential ridge, the secondary circumferential ridge including a first circumferential ridge disposed on the first side of the seal plate immediately outboard of the second circumferential groove at a perimeter of the third removable panel, with an inner wall of the first circumferential ridge extending perpendicularly to the second circumferential groove, the secondary circumferential ridge further comprising a second circumferential ridge disposed on the second side of the seal plate, a portion of the second circumferential ridge of the secondary circumferential ridge disposed outboard of the second circumferential groove, the second circumferential ridge of the secondary circumferential ridge having an inner wall perpendicular to the seal plate, the inner wall of the second circumferential ridge of the secondary circumferential ridge being radially inward of the inner wall of the first circumferential ridge of the secondary circumferential ridge, and the second circumferential ridge of the secondary circumferential ridge having a lower height off the second side of the seal plate than a height of the first circumferential ridge of the secondary circumferential ridge off the first side of the seal plate;

cutting through the seal plate along one of the first removable panel cutting guide and the second removable panel cutting guide and along an associated one of the first circumferential groove or the second circumferential groove;

forming an aperture in the seal plate by removing the respective second removable panel or third removable panel from the seal plate; and passing a pipe through the aperture formed in the seal plate.

8. The method of claim 7, wherein passing the pipe through the seal plate causing at least one of the frustoconical wall and the seal plate to flex.

9. The method of claim 7, wherein cutting through the seal plate along the cutting guide includes:

inserting a blade through the seal plate linearly adjacent a linear rib of the cutting guide associated with the removable panel to be removed; and advancing the inserted blade through the seal plate along a curved rib of the cutting guide associated with the removable panel to be removed, wherein the curved rib transitions the blade into cutting through the seal plate along the circumferential groove associated with the removable panel to be removed.

10. The method of claim 7, wherein removing the removable panel includes separating the seal plate from the frustoconical wall.

11. A seal component, comprising:

a cylindrical wall;

a frustoconical wall extending inwardly from the cylindrical wall;

a seal plate enclosing the frustoconical wall, the seal plate including a first removable panel, a second removable panel, and a third removable panel, the third removable panel disposed within an area of the second removable panel and the second removable panel disposed within an area of the first removable panel;

a primary circumferential ridge circumscribing the second removable panel, the primary circumferential ridge integrally formed with the seal plate and removably coupled with at least the second removable panel;

a first circumferential groove adjacent the primary circumferential ridge, wherein the first circumferential groove is radially inwardly disposed relative to the primary circumferential ridge, wherein the primary circumferential ridge includes a first circumferential ridge disposed on a first side of the seal plate immediately outboard of the first circumferential groove, with an inner wall of the first circumferential ridge extending perpendicularly to the first circumferential groove, the primary circumferential ridge further including a second circumferential ridge disposed on a second side of the seal plate, a portion of the second circumferential ridge disposed outboard of the first circumferential groove, the second circumferential ridge having an inner wall perpendicular to the seal plate, and the inner wall of the second circumferential ridge being radially inward of the inner wall of the first circumferential ridge, the second circumferential ridge having a lower height off the second side of the seal plate than a height of the first circumferential ridge off the first side of the seal plate;

a secondary circumferential ridge circumscribing the third removable panel, the secondary circumferential ridge integrally formed with the seal plate and removably coupled with at least the third removable panel; and a second circumferential groove adjacent the secondary circumferential ridge, wherein the second circumferential groove is radially inwardly disposed relative to the secondary circumferential ridge, wherein the secondary circumferential ridge includes a first circumferential ridge disposed on the first side of the seal plate immediately outboard of the second circumferential groove, with an inner wall of the first circumferential ridge extending perpendicularly to the second circumferential groove at the perimeter of the third removable panel, the secondary circumferential ridge further comprising a second circumferential ridge disposed on the second side of the seal plate, a portion of the second circumferential ridge of the secondary circumferential ridge disposed outboard of the second circumferential groove at the perimeter of the third removable panel, the second circumferential ridge of the secondary circumferential ridge having an inner wall perpendicular to the seal plate, the inner wall of the second circumferential ridge of the secondary circumferential ridge being radially inward of the inner wall of the first circumferential ridge of the secondary circumferential ridge, and the second circumferential ridge of the secondary circumferential ridge having a lower height off the second side of the seal plate than a height of the first circumferential ridge of the secondary circumferential ridge off the first side of the seal plate.

12. The seal component of claim 11, wherein each of the first, second, and third removable panels is circular and not coaxial.

13. The seal component of claim 11, wherein each of the first and second circumferential grooves is, in cross-section, a rectangular notch.

14. The seal component of claim 11, wherein the seal plate is integrally formed with the frustoconical wall.

15. The seal component of claim 14, further comprising an additional circumferential groove disposed between the seal plate and the frustoconical wall.

16. The seal component of claim 12, wherein a base of each of the first, second, and third removable panels is approximately tangential with one another.

17. The seal component of claim 12, wherein each of the first and second circumferential grooves has associated therewith a respective cutting guide including a raised rib disposed on the seal plate that leads into, and is configured to guide a blade into, the associated circumferential groove, the raised rib including a linear rib portion and a curved rib portion disposed between the linear rib portion and the associated circumferential groove.

* * * * *